(12) United States Patent
Goto et al.

(10) Patent No.: US 6,216,309 B1
(45) Date of Patent: Apr. 17, 2001

(54) WIPER DEVICE FOR VEHICLE

(75) Inventors: Masami Goto; Toshio Kobayashi; Hiroshi Ohsaki; Hiroshi Kojima; Masaaki Shimuba, all of Kanagawa-ken (JP)

(73) Assignees: Nissan Motor Co., Ltd.; Jidosha Denki Kogyo Kabushiki Kaisha, both of Yokohama (JP)

( * ) Notice: Subject to any disclaimer, the term of this patent is extended or adjusted under 35 U.S.C. 154(b) by 0 days.

(21) Appl. No.: 09/190,058

(22) Filed: Nov. 12, 1998

(30) Foreign Application Priority Data

Nov. 11, 1997 (JP) .................................................. 9-308954

(51) Int. Cl.$^7$ .................................. B60S 1/06; B60S 1/18
(52) U.S. Cl. ................. 15/250.31; 15/250.3; 296/96.17; 296/189; 248/900; 403/DIG. 3
(58) Field of Search .............................. 15/250.3, 250.31, 15/250.27; 296/96.17, 96.15, 189; 248/900, 214, 205.1; 403/DIG. 3, 24, 291, 220, 224

(56) References Cited

U.S. PATENT DOCUMENTS

| | | | |
|---|---|---|---|
| 5,441,227 | * 8/1995 | Hayashi | 15/250.31 |
| 5,706,547 | * 1/1998 | Kobayashi | 15/250.31 |
| 5,836,042 | * 11/1998 | Funk et al. | 15/250.3 |
| 5,960,512 | * 10/1999 | Schael et al. | 15/250.31 |

FOREIGN PATENT DOCUMENTS

| | | | |
|---|---|---|---|
| 5-32153 | * 2/1993 | (JP) | 15/253.3 |
| 5-270362 | 10/1993 | (JP) . | |

* cited by examiner

Primary Examiner—Gary K. Graham
(74) Attorney, Agent, or Firm—Foley & Lardner

(57) ABSTRACT

A wiper device for a vehicle disclosed is provided with a wiper motor, a wiper pivot connected to the wiper motor, and a wiper frame in which the wiper pivot is arranged. In this case, the wiper pivot can rotate around the pivot axis thereof by using a drive force from the wiper motor, and the wiper pivot extends so as to project toward an outer side of the vehicle body. Further, the wiper frame has a bracket portion fixing the wiper frame to the vehicle body. Then, in the structure mentioned above, it is constructed in such a manner that the bracket portion of the wiper frame is released from the vehicle body so as to move the wiper pivot to an inner side of the vehicle body when a load equal to or more than a predetermined value acts on the wiper pivot.

8 Claims, 3 Drawing Sheets

WIPER DEVICE FOR VEHICLE

The contents of Application No. TOKUGANHEI 9-308954, with a filling date of Nov. 11, 1997 in Japan, are hereby incorporated by reference.

BACKGROUND OF THE INVENTION

1. Field of the Invention

The present invention relates to a wiper device for a vehicle, and particularly to a wiper device for a vehicle preferably usable for a vehicle provided with a structure of a so-called concealed wiper type in which an upper portion of a wiper unit is covered with a rear end portion of an engine hood and provided with the wiper which is a so-called frame type one.

2. Description of the Related Art

The so-called frame type wiper unit is structured such that right and left wiper frames each disposing the wiper pivot in a standing manner are integrally connected to each other by a connection pipe.

Then, it is also structured such that an end portion of each of the right and left wiper frames is fastened and fixed to a bracket fixed to a cowl box in a vehicle body side so as to be arranged within the cowl box.

Further, in a vehicle provided with the structure of the so-called concealed wiper type disclosed in Japanese Patent Application Laid-Open Publication No. 5-270362, an end portion of an engine hood extends outwardly near a lower side portion of a front window panel, thereby covering an upper portion of a wiper unit.

However, in such a structure, since the rear end portion of the engine hood becomes close to the upper end of a wiper pivot of the wiper unit, the rear end portion of the engine hood is brought into contact with the wiper pivot when a collision load acts on the rear end portion of the engine hood from the upper side of the vehicle body downward to the lower side of the vehicle body at a time of a collision of the vehicle or the like, so that the engine hood tends to be prevented from freely deforming downward. That is, such a restriction of the deformation corresponds to a restricting condition in the case of desiring to increase an absorption amount of a collision energy.

This situation is similarly applied to the case that the frame type wiper unit is employed to the vehicle provided with the structure of the concealed wiper type.

SUMMARY OF THE INVENTION

An object of the present invention is to provide a wiper device for a vehicle which can improve an absorption characteristic of a collision energy without substantially restricting a deformation of a rear end portion of an engine hood to a lower side of a vehicle body by means of a wiper pivot when a load due to a collision or the like acts on the rear end portion of the engine hood from an upper side of the vehicle body (corresponding to an outer side of the vehicle body) to the lower side of the vehicle body (corresponding to an inner side of the vehicle body).

That is, the wiper device for the vehicle in accordance with the present invention is provided with a wiper motor, a wiper pivot connected to the wiper motor, and a wiper frame in which the wiper pivot is arranged.

In this case, the wiper pivot can rotate around the pivot axis thereof by using a drive force from the wiper motor, and the wiper pivot extends so as to project toward the outer side of the vehicle body. Further, the wiper frame has a bracket portion attaching the wiper frame to the vehicle body.

Then, in the structure mentioned above, it is further constructed such that the bracket portion of the wiper frame is released from the vehicle body when a load equal to or more than a predetermined value acts on the wiper pivot, thereby moving the wiper pivot to the inner portion of the vehicle body.

Accordingly, in the wiper device for the vehicle in accordance with the present invention, when the load due to a collision or the like acts on the rear end portion of the hood member typically corresponding to the engine hood from the outer side of the vehicle body to the inner side thereof, and more particularly, from the upper side of the vehicle body to the lower side thereof, a deformation of the rear end portion of the hood member to the lower side of the vehicle body is substantially made free by means of the wiper pivot structured in the above manner, thereby improving the absorption characteristic for the collision energy.

In this case, the wiper pivot is covered with the hood member in the outer side of the vehicle, and the load at a time of collision or the like acts on the wiper pivot through the hood member, typically.

Particularly, in the wiper device for the vehicle in accordance with the present invention, it is preferable to structure such that the bracket portion is provided with a mounting hole having a notch portion, a mount rubber attached to the vehicle body is fitted and attached to the mounting hole of the bracket portion, and the bracket portion is released from the mount rubber through the notch portion of the mounting hole so as to move the wiper pivot to the inner side of the vehicle body when the load equal to or more than the predetermined value acts on the wiper pivot.

In accordance with this structure mentioned above, when the notch portion of the mounting hole in the bracket portion, for example, the notch portion having a neck portion is released from a mounting cutout of the mounting rubber corresponding to the mounting hole, for example, an annular cutout so as to pass through the mounting cutout due to the load acting on the wiper pivot, the collision energy can be absorbed due to an elastic deformation of the mount rubber and a frictional resistance between the mounting cutout of the mount rubber and the mounting hole of the bracket portion, so that the absorption characteristic for the collision energy can be further securely improved.

Further, an amount of absorbing the collision energy by the mount rubber can be simply tuned by adjusting an amount of a compressive deformation of the mount rubber, for example, by changing a length of a collar of the mount rubber.

More particularly, it is preferable for more certainly and effectively releasing the bracket portion from the mount rubber that the bracket portion has an extending flat surface portion directed to the outer side of the vehicle body, particularly to the upper side of the vehicle body, the mounting hole is formed on the flat surface portion of the bracket portion, and the notch portion is formed by cutting out a part of the bracket portion, on which the mounting hole is formed, in the outer side of the vehicle body.

In the meanwhile, particularly, the structure can be preferably made in such a manner that the bracket portion has a mounting hole, the mount rubber attached to the vehicle body is fitted and attached to the mounting hole, whereby the bracket portion is supported to the vehicle body, and when the load equal to or more than the predetermined value acts on the wiper pivot, the bracket portion is released from the mount rubber while deforming the mount rubber, thereby moving the wiper pivot to the inner side of the vehicle body, particularly to the lower side of the vehicle body.

In accordance with this structure mentioned above, since the collision energy can be absorbed due to an elastic deformation of the mount rubber and a frictional resistance between a mounting cutout of the mount rubber and the mounting hole of the bracket portion when the mounting hole of the bracket portion is released from the mounting cutout of the mount rubber corresponding to the mounting hole, for example, an annular cutout so as to pass through the mounting cutout due to the load acting on the wiper pivot, the absorbing characteristic for the collision energy can be further certainly improved.

More particularly, it is preferable for more certainly and effectively releasing the bracket portion from the mount rubber that the bracket portion has a flat surface portion extending substantially in parallel to a surface crossing the pivot axis, the mounting hole is formed on the flat surface portion, the mount rubber is provided with a collar so that the mount rubber is attached to the vehicle body, and a flange having a non-symmetrical shape with respect to an axial direction of the collar is provided in an end portion of the collar opposite to an end portion of the collar contacting the vehicle body.

Further, an amount of absorbing the collision energy by the mount rubber can be simply tuned by adjusting an amount of a compressive deformation of the mount rubber by changing a length of the collar of the mount rubber, and/or by adjusting an offset amount between the mounting hole of the bracket portion and the come-out prevention flange of the collar in their diametrical directions.

And, putting more actually, the structure may be made such that the wiper frame is provided in each of a left side and a right side of the vehicle body, the wiper motor is provided in one of the wiper frame in the left side and the wiper frame in the right side, the bracket portion is provided in each of the wiper frame in the left side and the wiper frame in the right side, the wiper pivot is provided in each of the wiper frame in the left side and the wiper frame in the right side, and a connection pipe interconnects between the wiper frame in the left side and the wiper frame in the right side, whereby the wiper device is effectively unitized and structured to be more simple.

DETAILED DESCRIPTION OF THE PREFERRED EMBODIMENTS

Each of embodiments in accordance with the present invention will be described in detail with respect to the drawings.

At first, a first embodiment in accordance with the present invention will be described.

Figure 1:
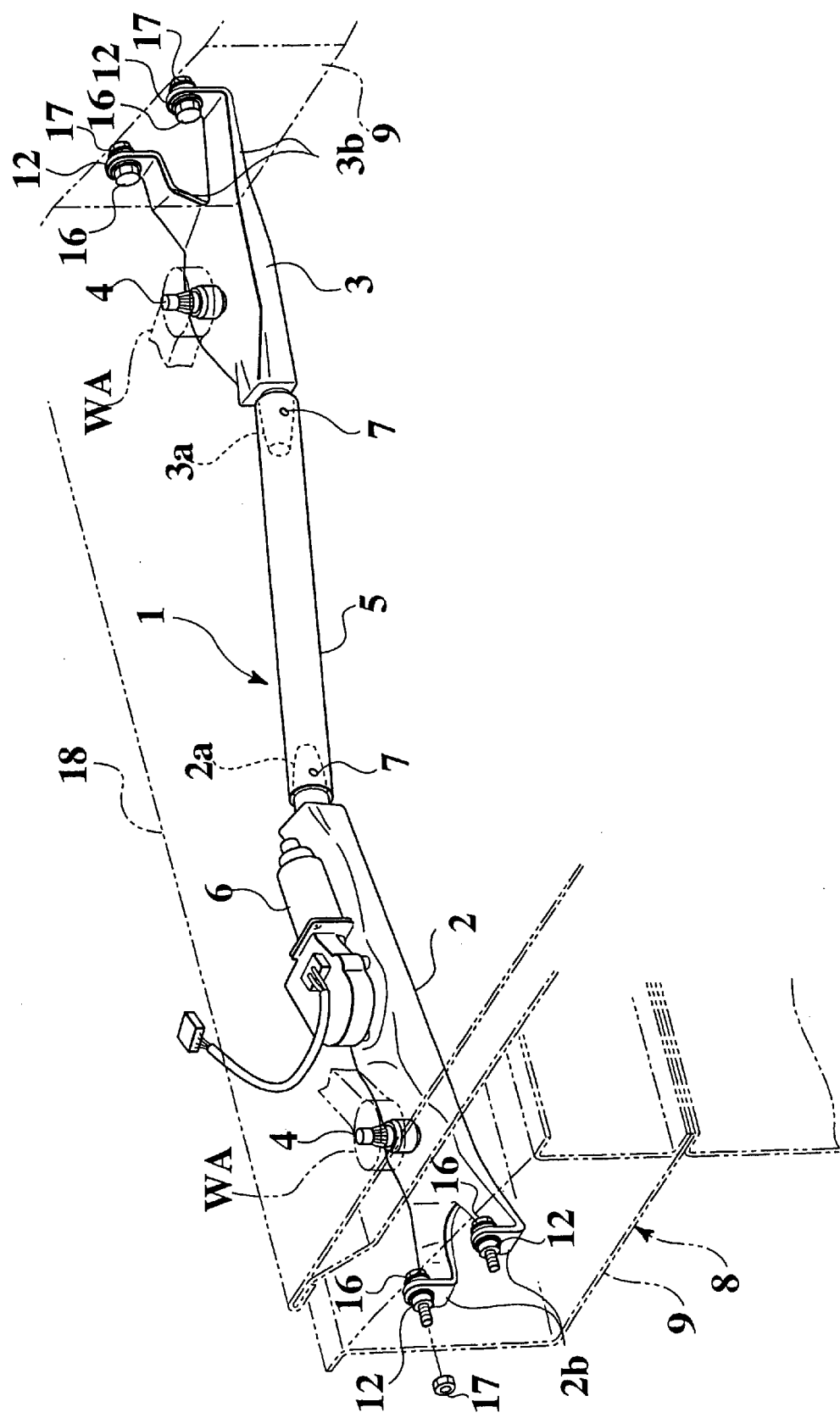
FIG. 1 is a perspective view which shows a wiper unit of a wiper device for a vehicle in accordance with a first embodiment of the present invention.
Figure 2:
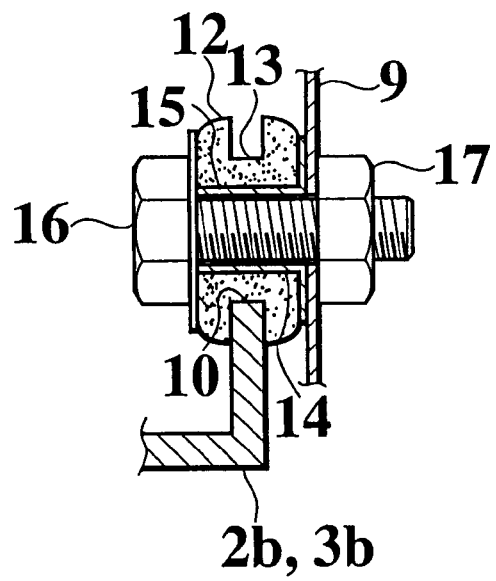
FIG. 2 is a cross sectional view which shows a mounting portion of the bracket portion to a vehicle body in accordance with the first embodiment.
Figure 3:
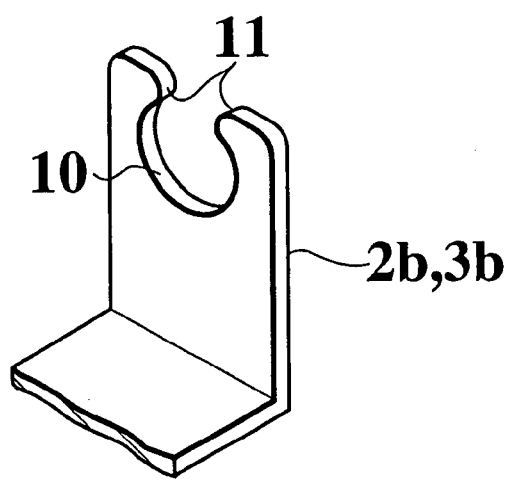
FIG. 3 is a perspective view of the bracket portion in accordance with the first embodiment.

In FIGS. 1 to 3, a wiper unit 1 of a frame type of a wiper device for a vehicle in accordance with this embodiment is provided with a wiper frame unit corresponding to a wiper device element and structured by left and right wiper frames 2 and 3 correspondingly positioned in a left side and a right side of a vehicle body of the vehicle and respectively having wiper pivots 4 and 4 in a standing manner, and a cylindrical connection pipe 5 connecting the wiper frames 2 and 3 to each other, and a wiper motor 6 corresponding to a wiper device element assembled in the wiper frame 2.

In this case, a wiper arm WA corresponding to a wiper device element is attached to the wiper pivot 4, and the other elements such as a pivot arm and a wiper link connected to the wiper motor 6, a wiper blade attached to the wiper arm WA and the like are omitted in illustration.

Further, each of the wiper device elements is integrally assembled to the wiper frame unit.

More particularly, at ends of each of the wiper frames 2 and 3 which are opposed to each other, connecting projections 2a and 3a each having a circular cross section are provided in a projecting manner. The wiper frames 2 and 3 are connected to the connection pipe 5 by fitting the connection pipe 5 to the connecting projections 2a and 3a and fixing such fitting portions by a rivet 7, respectively.

On the contrary, bracket portions 2b and 3b branched into two portions are formed in the other ends of the wiper frames 2 and 3, and in this embodiment, these bracket portions 2b and 3b are bent to an upper side corresponding to an outer side of the vehicle body.

And, in the left side and the right side of the vehicle body, each of brackets 9 and 9 is connected to and arranged on a bottom wall of the cowl box 8 so as to stand from the bottom wall and extend to the upper side.

Further, in the wiper unit 1 in accordance with this embodiment, each of the bracket portions 2b and 3b is fastened and fixed to the bracket 9 by bolts 16 and 16 and nuts 17 and 17 such that each of the bracket portions 2b and 3b can release to a lower side corresponding to an inner side of the vehicle body when a load equal to or more than a predetermined value acts on corresponding one of the wiper pivots 4 and 4 from the upper side corresponding to the outer side of the vehicle body in a direction of a pivot axis of corresponding one of the wiper pivots 4 and 4. The pivot axis substantially extends in a vertical direction of the vehicle body and each of the wiper pivots 4 and 4 rotates around the pivot axis by use of a drive force from the wiper motor 6.

Particularly, at each of portions where the bracket portions 2b and 3b are fastened and fixed to the brackets 9 and 9, a mounting hole 10 is formed on each of the bracket portions 2b and 3b, and its upper edge portion where the mounting hole 10 is formed and which corresponds to the outer side of the vehicle body is cut out, thereby forming a neck portion 11 corresponding to a notch portion.

Then, an annular mount rubber 12 is fitted and fixed to each mounting hole 10 of the bracket portions 2b and 3b by press fitting an annular cutout (annular groove) 13 formed on an outer peripheral surface of the mount rubber 12 to the mounting hole 10 through its neck portion 11. Here, a metal-made cylindrical collar 15 through which the bolt 16 can be inserted is press fitted to and arranged in a center hole 14 of the mount rubber 12.

And then, the bolt 16 is inserted to the collar 15 of the mount rubber 12 and the nut 17 is threaded and fastened in a back surface side of the bracket 9, so that the mount rubber 12 is attached to the bracket 9 such that the neck portion 11 of the mounting hole 10 can pass downward from the annular cutout 13 of the mount rubber 12.

In the case of applying the wiper unit 1 in accordance with this embodiment to the vehicle provided a structure of the concealed wiper type, since the rear end portion of the engine hood 18 extends so as to come near a lower portion of a front window panel (not shown), an upper portion of the wiper unit 1 is covered with the rear end portion of the engine hood 18, and an upper end of the wiper pivot 4 is going to come near the lower surface of the rear end portion of the engine hood 18.

Therefore, when a collision load acts on the rear end portion of the engine hood 18 from the upper side corresponding to the outer side of the vehicle body at a time of a collision of the vehicle, the rear end portion of the engine hood 18 deforms to the lower side corresponding to the inner side of the vehicle body and interferes with the upper end of the wiper pivot 4.

In this case, when a collision load equal to or more than a predetermined value acts on the wiper pivots 4 and 4 from the upper side corresponding to the outer side of the vehicle body to the lower side corresponding to the inner side of the vehicle body in the direction of the pivot axis, the neck portion 11 of each mounting hole 10 of the bracket portions 2b and 3b passes downward from the annular cutout 13 of the mount rubber 12, so that the bracket portions 2b and 3b are released downward from the brackets 9 and 9.

Accordingly, the wiper pivots 4 and 4 can move downward together with the wiper frames 2 and 3, thereby making a downward deformation of the rear end portion of the engine hood 18 free, increasing a collapsing deformation stroke of the rear end portion of the engine hood 18 and improving an absorption characteristic for a collision energy.

Here, the collision energy can be absorbed by the elastic deformation of the mount rubber 12 itself and the frictional resistance between the mount rubber 12 and an edge of the mounting hole 10 when the neck portion 11 of the mounting hole 10 passes through from the annular cutout 13 of the mount rubber 12 due to the load acting on the wiper pivot 4, the absorption characteristic for the collision energy can be further improved.

Further, an amount of absorbing the collision energy by the mount rubber 12 can be simply tuned by adjusting an amount of a compressive deformation of the mount rubber 12 by changing a length of the collar 15.

A second embodiment in accordance with the present invention will be described below.

Figure 4:
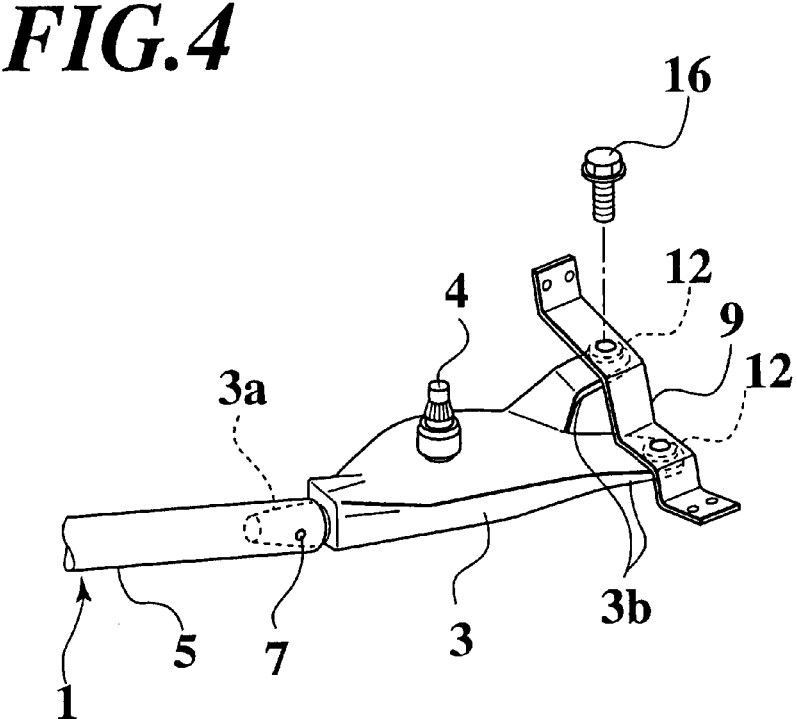
FIG. 4 is a perspective view which shows a mounting portion of a bracket portion to a vehicle body in accordance with a second embodiment of the present invention.
Figure 5:
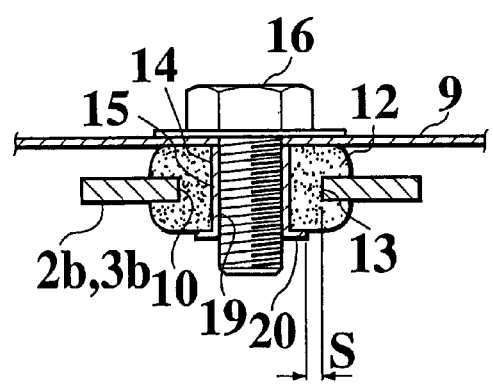
FIG. 5 is a cross sectional view which shows a mounting portion of the bracket portion to the vehicle body in accordance with the second embodiment.

FIGS. 4 and 5 shows a structure of a wiper unit 1 in accordance with this embodiment, and there is mainly a difference with respect to the first embodiment in the view that while each of the bracket portions 2b and 3b of the wiper frames 2 and 3 is provided so as to extend in a substantially horizontal direction of the vehicle body and cross the pivot axis of its wiper pivot 4, each bracket 9 in the cowl box 8 side is also correspondingly arranged so as to extend in a horizontal direction of the vehicle body, thereby fastening and fixing the bracket portions 2b and 3b to the lower surface of each bracket 9 by the bolt 16.

Particularly, each mount rubber 12 and its corresponding mounting hole 10 of the bracket portions 2 and 3 are fitted and fixed to each other, however, the notch portion 11 is not formed to each mounting hole 10 of the bracket portions 2b and 3b.

Further, the collar 15 in which a threaded portion 19 is formed on its inner periphery is press fitted to and arranged in the center hole 14 of the mount rubber 12, the collar 15 is directly fastened onto the lower surface of the bracket 9 by screwing the bolt 16 to the threaded portion 19 of the collar 15, and each of the bracket portions 2a and 3b is attached to the bracket 9 in the side of the vehicle body while compressing and deforming the mount rubber 12 between the bracket 9 and a come-out prevention flange 20 of the collar 15.

Here, this come-out prevention flange 20 is bent and formed in a lower edge of the collar 15. Then, the come-out prevention flange 20 of the collar 15 is structured such that a part thereof is formed to have a radius smaller than that of each of the mounting holes 10 of the bracket portions 2b and 3b and a predetermined offset amount S is set between an outer edge of the come-out prevention flange 20 and an edge of the mounting hole 10 in a diametrical direction of the mount rubber 12, as shown in FIG. 5.

Further, the mount rubber 12 and the mounting hole 10 are set such that the edge of the mounting hole 10 passes through from the mount rubber 12 by elastically deforming a portion of a lower edge of the annular cutout 13 of the mount rubber 12 by means of the edge portion of the mounting hole 10 when the load equal to or more than the predetermined value acts on each of the wiper pivots 4 and 4 from the upper side of the vehicle body in the direction of the pivot axis thereof.

In the structure of this embodiment mentioned above, when the load equal to or more than the predetermined value acts on each of the wiper pivots 4 and 4 through the rear end portion of the engine hood 18 from the upper side corresponding to the outer side of the vehicle body to the lower side corresponding to the inner side of the vehicle body in the direction of its pivot axis at a time of a collision of the vehicle or the like in the same manner as that of the first embodiment, the portion of the lower edge of the annular cutout 13 of the mount rubber 12 is elastically deformed by the edge portion of each mounting hole 10 of the bracket portions 2b and 3b and the edge of the mounting hole 10 passes through from the mount rubber 12 and the bracket portions 2b and 3b are released downward from the bracket 9.

Then, each of the wiper pivots 4 and 4 moves downward together with the wiper flames 2 and 3 so as to make a downward deformation of the rear end portion of the engine hood 18 substantially free, thereby increasing the collapsing deformation stroke of the rear end portion of the engine hood 18 and further improving the absorption characteristic for the collision energy.

Further, also in this embodiment, the collision energy can be absorbed by an elastic deformation of the mount rubber 12 and a frictional resistance between the mount rubber 12 and the edge of the mounting hole 10 when the edge of the mounting hole 10 passes through from the mount rubber 12 due to the load acting on each of the wiper pivots 4 and 4, the absorption characteristic for the collision energy can be further improved.

Still further, an amount of absorbing the collision energy by the mount rubber 12 can be tuned by adjusting an amount of a compressive deformation of the mount rubber 12 by changing a length of the collar 15, and can be also simply tuned by adjusting the offset amount S in a diametrical direction between the edge of the mounting hole 10 and the edge of the come-out prevention flange 20 for the collar 15.

In addition, in this embodiment, each of the bracket portions 2b and 3b of the wiper flames 2 and 3 extends in the substantially horizontal direction of the vehicle body, and each bracket 9 in the side of the cowl box 8 is also correspondingly extended in the horizontal direction of the vehicle body, however, principally, another structure may be made as far as the load acts such that the edge of each mounting hole 10 of the bracket portions 2b and 3b passes through from the mount rubber 12 at a time of a collision or the like, and, for example, it is sufficient that each of the bracket portions 2b and 3b is extended in a substantially parallel direction to a plane crossing the pivot axis of the wiper pivot 4, and each bracket 9 in the side of the cowl box 8 is correspondingly arranged in this direction.

What is claimed is:

1. A wiper device for a vehicle comprising:

a wiper motor;

a wiper pivot operatively connected to said wiper motor, said wiper pivot rotating around a pivot axis thereof in response to a drive force from said wiper motor, said wiper pivot extending outwardly beyond an outer side of a vehicle body; and a wiper frame supporting said wiper pivot, a bracket portion attaching said wiper frame to said vehicle body, said bracket portion having a mounting hole formed therein; and a mount rubber which is secured to the vehicle body, said mount rubber being disposed in the mounting hole and so constructed and arranged that upon a load which is at least equal to a predetermined value and which acts axially along the wiper pivot, being applied to said wiper pivot, the bracket portion deforms only said mount rubber and detaches from said mount rubber, whereby said bracket portion is released from said vehicle body and said wiper pivot moves back to a non-projective position on an inner side of of the vehicle body.

2. A wiper device for a vehicle according to claim 1, wherein said bracket portion has a mounting hole including a notch portion, a mount rubber attached to said vehicle body is fitted and attached to said mounting hole so that said bracket portion is attached to said vehicle body, and when said load equal to or more than said predetermined value acts on said wiper pivot, said bracket portion is released from said mount rubber through said notch portion of said mounting hole so as to move said wiper pivot to said inner side of said vehicle body.

3. A wiper device for a vehicle according to claim 2, wherein said bracket portion has a flat surface portion extending toward said outer side of said vehicle body, said mounting hole is formed on said flat surface portion, and said notch portion is formed by cutting out a part of said bracket portion, on which said mounting hole is formed, in said outer side of said vehicle body.

4. A wiper device for a vehicle according to claim 1, wherein said bracket portion has a flat surface portion extending in parallel to a surface crossing said pivot axis, said mounting hole is formed on said flat surface portion, said mount rubber is provided with a collar so that said mount rubber is attached to said vehicle body, and a flange portion formed in a nonsymmetrical shape with respect to an axial direction of said collar is provided in an end portion of said collar opposite to an end portion of said collar contacting said vehicle body.

5. A wiper device for a vehicle according to claim 1, wherein said wiper frame is provide in each of a left side and a right side of said vehicle body, said wiper motor is provided on one of said wiper frame in said left and said wiper frame in said right side, said bracket portion is provided in each of said wiper frame in said left side and said wiper frame in said right side, said wiper pivot is provided in each of said wiper frame in said left side and said wiper frame in said right side, and a connection pipe interconnects said wiper frame in said left side and said wiper frame in said right side.

6. A wiper device for a vehicle according to claim 1, wherein said wiper pivot is concealed behind a hood member forming part of the vehicle body, and wherein said load is applied to said wiper pivot by said hood member.

7. A wiper device for a vehicle according to claim 1, wherein said mount rubber is supported on a metal collar, the metal collar having a flange portion, a radius of at least a part of the flange portion being smaller than that of that of a mounting hole of said bracket.

8. A wiper device for a vehicle comprising:

first and second wiper frames disposed in first and second spaced positions in a vehicle body;

a wiper motor supported on one of the first and second frames;

a first and second wiper pivots respectively supported on the first and second frames;

drive connection means for operatively connecting the first and second pivots so that the wiper motor is placed in drive connection with both the first and second pivots; and first and second mounting arrangements which interconnect the first and second wiper frame to the vehicle so that the first and second wiper pivots project beyond an exterior surface of the vehicle into a concealed location aft of a trailing edge of a hood member forming part of the vehicle, each of the first and second mounting arrangements including a bracket and a mount rubber, the mount rubber being connected to the vehicle body and snugly disposed in an opening formed in the bracket, the mount rubber being so constructed and arranged that, when a predetermined amount of force is applied to one of the first and second wiper pivots by contact with a portion of the hood member, the force is transmitted to the bracket, causes the bracket to distort only the rubber mount and to detach from the rubber mount releasing the interconnection between the vehicle and the respective one of the first and second frames and permitting the respective first and second wiper pivots to move back into the vehicle to a position wherein it is non-projective and does not interfere with bucking deformation of the hood member.

* * * * *